United States Patent
Higgins

(10) Patent No.: US 11,373,179 B2
(45) Date of Patent: Jun. 28, 2022

(54) METHOD AND SYSTEM FOR SECURE AND VERIFIABLE OFFLINE BLOCKCHAIN TRANSACTIONS

(71) Applicant: MASTERCARD INTERNATIONAL INCORPORATED, Purchase, NY (US)

(72) Inventor: Stephen Higgins, Cork (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 361 days.

(21) Appl. No.: 16/509,765

(22) Filed: Jul. 12, 2019

(65) Prior Publication Data

US 2021/0012331 A1    Jan. 14, 2021

(51) Int. Cl.
*G06Q 20/38* (2012.01)
*H04L 9/08* (2006.01)
(Continued)

(52) U.S. Cl.
CPC ......... *G06Q 20/389* (2013.01); *G06Q 20/027* (2013.01); *G06Q 20/3829* (2013.01);
(Continued)

(58) Field of Classification Search
None
See application file for complete search history.

(56) References Cited

U.S. PATENT DOCUMENTS

| 10,810,581 B2 * | 10/2020 | Govindarajan | G06Q 20/367 |
| 2015/0278796 A1 * | 10/2015 | Jiang | G06Q 20/3825 705/44 |

(Continued)

FOREIGN PATENT DOCUMENTS

| CA | 2941280 A1 * | 3/2018 | ......... G06F 21/6227 |
| WO | 2017/139060 A1 | 8/2017 | |

(Continued)

OTHER PUBLICATIONS

Antonopoulos, "Transactions, chapter 5" from Mastering Bitcoin, downloaded from https://www.oreilly.com/library/view/mastering-bitcoin/9781491902639/ch05.html and attached as PDF file; also attached are screenshots of Wayback Machine for date support. (Year: 2018).*

(Continued)

*Primary Examiner* — James D Nigh
*Assistant Examiner* — Margaret M Neubig
(74) *Attorney, Agent, or Firm* — Buchanan Ingersoll & Rooney PC

(57) ABSTRACT

A method for performing secure, verifiable, offline blockchain transactions through a trusted execution environment and time-limited credentials includes: storing, in a trusted execution environment of a computing device, a cryptographic key pair comprised of a public key and a private key; transmitting, by a transmitter of the computing device, the public key to a gateway device in a blockchain network; receiving, by a receiver of the computing device, a time-limited credential from the gateway device; generating, by a processing device of the computing device, a blockchain data value, wherein the blockchain data value includes at least the time-limited credential, a transaction amount, and a destination address; digitally signing, by the trusted execution environment of the computing device, the generated blockchain data value using the private key; and transmitting, by the transmitter of the computing device, the signed blockchain data value to an external device.

20 Claims, 5 Drawing Sheets

(51) Int. Cl.
  *H04L 9/32* (2006.01)
  *G06Q 20/02* (2012.01)
  *H04L 9/30* (2006.01)

(52) U.S. Cl.
  CPC .............. *H04L 9/0894* (2013.01); *H04L 9/30* (2013.01); *H04L 9/3228* (2013.01); *H04L 9/3247* (2013.01); *G06Q 2220/00* (2013.01); *H04L 2209/38* (2013.01)

(56) References Cited

U.S. PATENT DOCUMENTS

| | | | |
|---|---|---|---|
| 2016/0125403 A1* | 5/2016 | Hu ..................... | G06Q 20/3276 705/71 |
| 2018/0068130 A1* | 3/2018 | Chan ................... | G06F 21/606 |
| 2018/0330360 A1* | 11/2018 | Chen .................. | G06Q 20/4037 |

FOREIGN PATENT DOCUMENTS

| | | |
|---|---|---|
| WO | 2018/223125 A1 | 12/2018 |
| WO | WO-2018223125 A1 * | 12/2018 ........... H04L 9/0825 |

OTHER PUBLICATIONS

"Secure Wallet-Assisted Offline Bitcoin Payments with Double-Spender Revocation", (downloaded from https://www.researchgate.net/publication/315854937_Secure_Wallet-Assisted_Offline_Bitcoin_Payments_with_Double-Spender_Revocation, attached as PDF file. (Year: 2017).*

Notification of Transmittal of the International Search Report (Form PCT/ISA/220 and PCT/ISA/210) and the Written Opinion of the International Searching Authority (From PCT/ISA/237) dated Aug. 27, 2020, by the Federal Institute of Industrial Property in corresponding International Application No. PCT/US2020/036926. (7 pages).

\* cited by examiner

METHOD AND SYSTEM FOR SECURE AND VERIFIABLE OFFLINE BLOCKCHAIN TRANSACTIONS

FIELD

The present disclosure relates to secure and verifiable offline blockchain transactions, specifically the use of gateways and time-limited credentials in addition to trusted execution environments in embedded systems, such as mobile devices, to enable blockchain transactions to be conducted between computing devices without an active connection to any nodes in the associated blockchain network.

BACKGROUND

Blockchains used for the transfer of cryptographic currency have become popular in recent years as an alternative to traditional, fiat currencies. Blockchains have a number of perceived benefits over traditional payment systems, particularly the anonymity provided by blockchains as well as the transparency provided by most blockchains where every transaction is publicly viewable. However, blockchains also suffer from a number of drawbacks from their traditional payment network counterparts. One such drawback is the necessity for an active communication channel with a blockchain node.

In traditional payment transactions, messages are often exchanged with a payment network and financial institutions as part of the processing. However, in cases when no connection is available to the payment network or to financial institutions, payment transactions are sometimes permitted to be conducted offline. In these cases, a point of sale, gateway processor, merchant, acquiring institution, or other entity may be authorized by the payment network and/or issuing institution to perform on-behalf processing, where data available from the payment instrument itself can be used to authorize a payment transaction, with the information later being provided to the payment network for synchronization. Such methods can be beneficial in cases where communications may be weak or in instances of large network congestion that may make communications fail or take a significant amount of time.

For blockchains, however, there are currently no such methods. The processing of a blockchain transaction requires a connection to a node in a blockchain network for the proposed transaction to be verified (e.g., to ensure that the payer has enough currency to cover the transaction amount and has the right to use the provided unspent transaction outputs). Such a verification is often considered necessary, as any offline exchange could potentially enable a payer to use an unspent transaction output more than once before the blockchain was updated, thereby enabling the payer to use a unit of currency in multiple transactions, which would result in one or more of the payees losing out on their payment.

Thus, there is a need for a technical solution to enable a blockchain transaction to be conducted offline in a manner that provides correctness while preventing currency from being used in multiple offline transactions.

SUMMARY

The present disclosure provides a description of systems and methods for performing secure, verifiable, offline blockchain transactions through a trusted execution environment and time-limited credentials. A new type of blockchain node, referred to herein as a gateway, is used, where the gateway keeps a record of the amount of currency and unspent transaction outputs associated with each blockchain wallet registered therewith. When a user wants to be able to conduct a blockchain transaction offline, the blockchain wallet registers with a gateway and requests a time-limited credential therefrom. The credential is provided to the wallet, which can be transferred to a recipient during an offline exchange, along with other, traditional blockchain transaction information. In some embodiments, asset information is also stored in the device that keeps an accounting of the unspent transaction outputs available to the blockchain wallet even while offline, which is used to ensure that no outputs are double spent. This accounting, along with the time-limited credential, enables a blockchain transaction to be conducted offline, while preventing double spend, and enabling a payee to ensure that they will receive the proper currency when an active connection to a blockchain network is available, and also enabling the payee to use the currency immediately in subsequent offline transactions.

A method for performing secure, verifiable, offline blockchain transactions through a trusted execution environment and time-limited credentials includes: storing, in a trusted execution environment of a computing device, a cryptographic key pair comprised of a public key and a private key; transmitting, by a transmitter of the computing device, the public key to a gateway device in a blockchain network; receiving, by a receiver of the computing device, a time-limited credential from the gateway device; generating, by a processing device of the computing device, a blockchain data value, wherein the blockchain data value includes at least the time-limited credential, a transaction amount, and a destination address; digitally signing, by the trusted execution environment of the computing device, the generated blockchain data value using the private key; and transmitting, by the transmitter of the computing device, the signed blockchain data value to an external device.

A system for performing secure, verifiable, offline blockchain transactions through a trusted execution environment and time-limited credentials includes: a gateway device of a blockchain network; a computing device including a trusted execution environment storing a cryptographic key pair comprised of a public key and a private key, a transmitter transmitting the public key to the gateway device, a receiver receiving a time-limited credential from the gateway device, and a processing device generating a blockchain data value, wherein the blockchain data value includes at least the time-limited credential, a transaction amount, and a destination address, wherein the trusted execution environment digitally signs the generated blockchain data value using the private key, and the transmitter transmits the signed blockchain data value to an external device; and an external device receiving the signed blockchain data value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Performing Offline Blockchain Transactions

Figure 1:
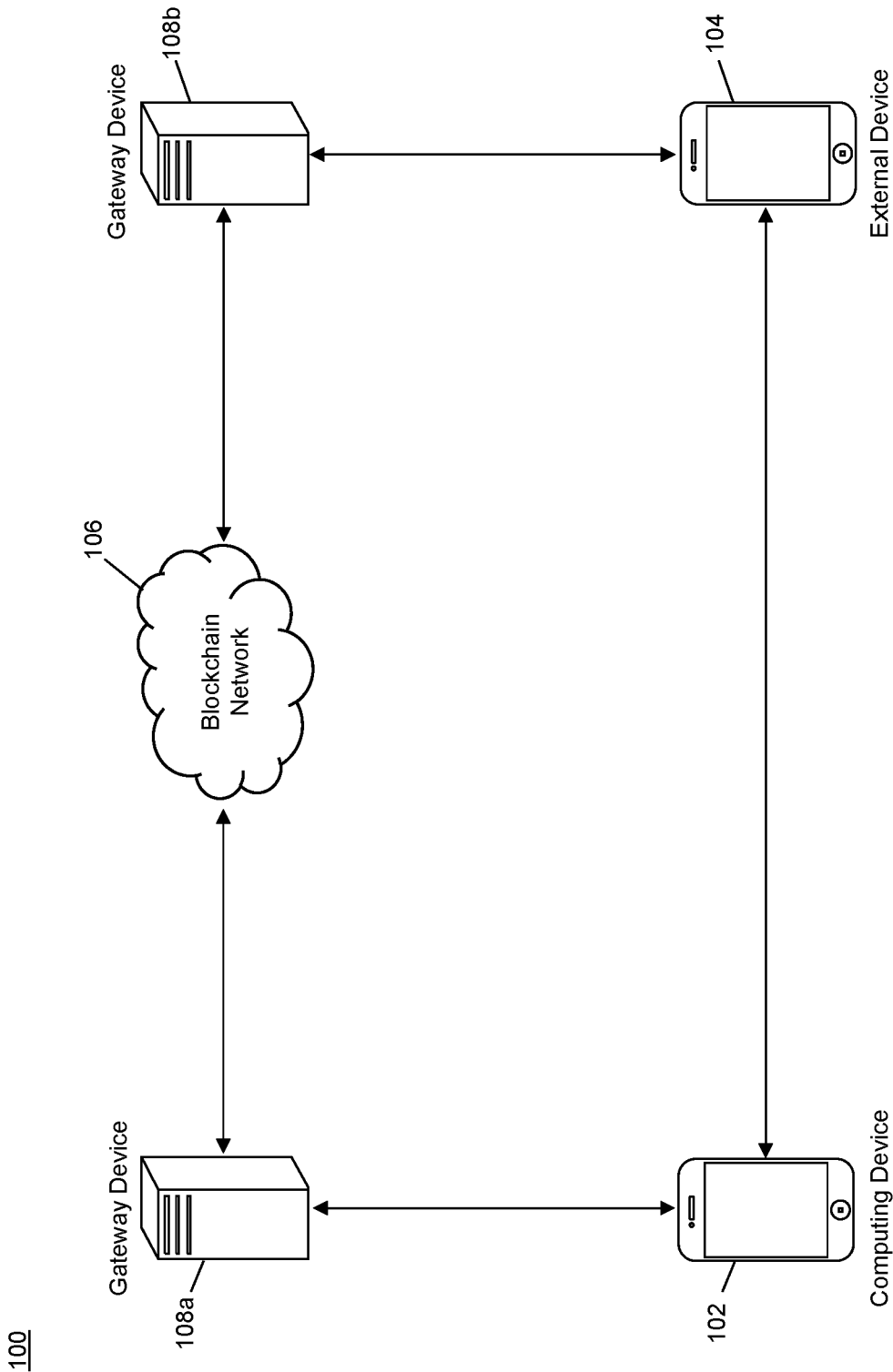
FIG. 1 is a block diagram illustrating a high level system architecture for performing offline blockchain transactions in accordance with exemplary embodiments.

FIG. 1 illustrates a system 100 for performing secure and verifiable blockchain transactions while offline (e.g., without an active connection to a blockchain node) through the use of a trusted execution environment (TEE) and time-limited credentials.

The system 100 may include a computing device 102. The computing device 102, discussed in more detail below, may include a blockchain wallet. The blockchain wallet, as discussed below, may be comprised of a cryptographic key pair including a public key and a private key, which may be stored in a TEE in the computing device 102. The TEE may be such that the data stored therein may be inaccessible by any component outside of the TEE in the computing device 102. In other words, the private key stored in the TEE of the computing device 102 may be inaccessible by any component of the computing device 102 except the TEE itself and any programs stored therein. The blockchain wallet may be used to transfer cryptographic currency as part of a blockchain network 106.

Figure 5:
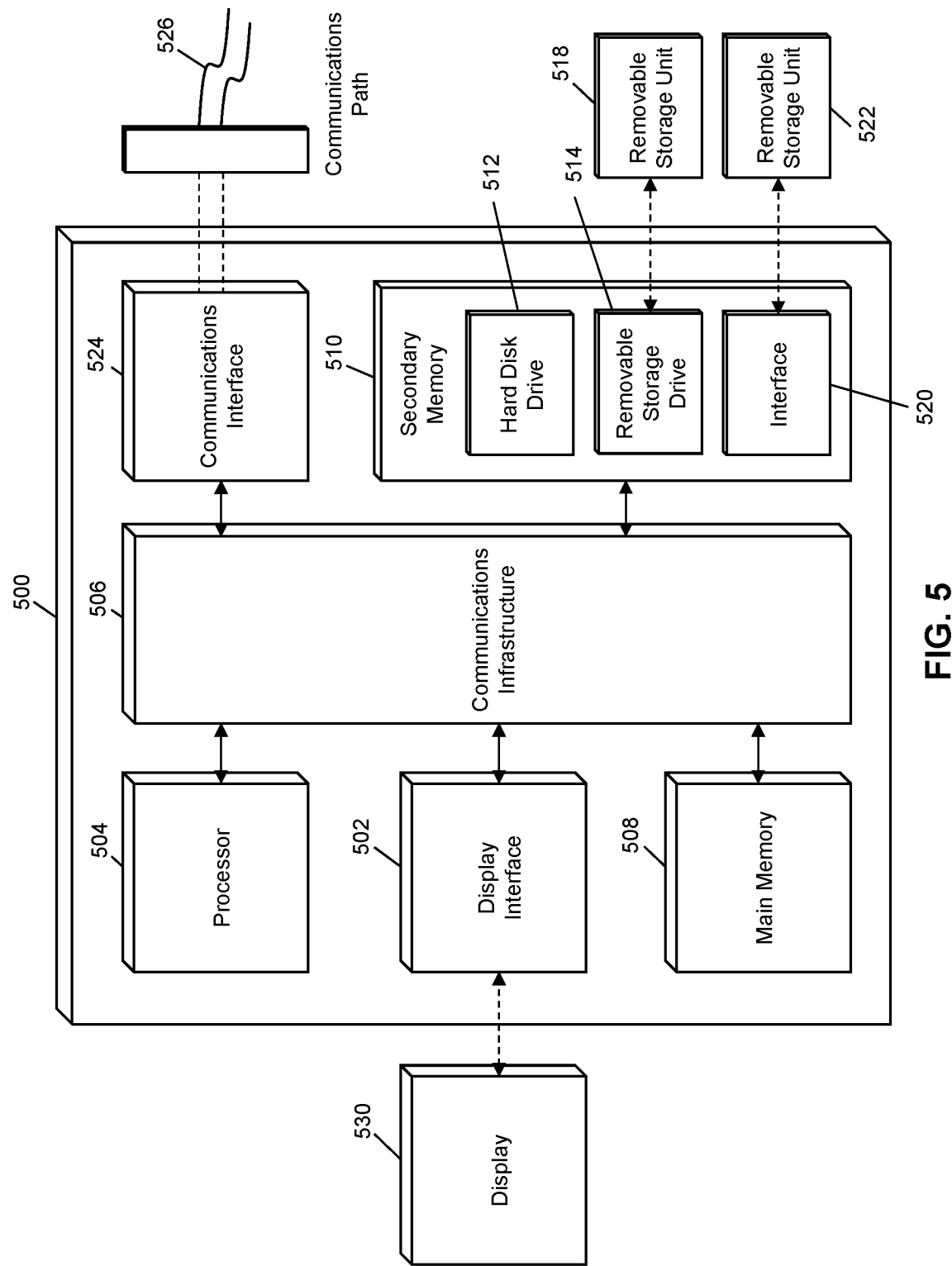
FIG. 5 is a block diagram illustrating a computer system architecture in accordance with exemplary embodiments.

The blockchain network 106 may be comprised of a plurality of blockchain nodes. Each node may be a computing system, such as illustrated in FIG. 5 discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the data reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 106 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 106 using the public key of the cryptographic key pair. In some cases, the term "blockchain wallet" may refer specifically to the private key. In other cases, the term "blockchain wallet" may refer to the computing device 102 that stores the private key for use thereof in blockchain transactions. For instance, each computing device 102 may each have their own private key for respective cryptographic key pairs, and may each be a blockchain wallet for use in transactions with the blockchain associated with the blockchain network. Computing devices 102 may be any type of device suitable to store and utilize a blockchain wallet, such as a desktop computer, laptop computer, notebook computer, tablet computer, cellular phone, smart phone, smart watch, smart television, wearable computing device, implantable computing device, etc., that is also configured to perform the additional functions discussed herein. For instance, any computing device that includes or otherwise has access to a TEE may be suitable as the computing device 102, which may include, for example, a smart card having a TEE that is inserted into a card reader that may operate as the computing device 102. In such instances, "computing device" may refer to the smart card and/or the card reader, as applicable.

Each blockchain data value stored in the blockchain may correspond to a blockchain transaction or other storage of data, as applicable. A blockchain transaction may consist of at least: a digital signature of the sender of currency (e.g., the computing device 102) that is generated using the sender's private key, a blockchain address of the recipient of currency (e.g., an external device 104, which may be another computing device 102 that includes its own blockchain wallet but may be a recipient for a transaction involving the computing device 102) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a node in the blockchain network 106, either by the sender or the recipient. The node may verify the digital signature using the public key in the cryptographic key pair of the sender's wallet and also verify the sender's access to the funds (e.g., that the unspent transactions have not yet been spent and were sent to an address associated with the sender's wallet), and then include the blockchain transaction in a new block. The new block may be validated by other nodes in the blockchain network 106 before being added to the blockchain and distributed to all of the nodes in the blockchain network 106 in traditional blockchain implementations. In cases where a blockchain data value may not be related to a blockchain transaction, but instead the storage of other types of data, blockchain data values may still include or otherwise involve the validation of a digital signature.

In the system 100, the blockchain network 106 may include one or more gateway devices 108 in addition to other nodes that comprise the blockchain network 106. A gateway device 108 may be a fully functional blockchain node that is also configured to perform additional functions discussed herein. A gateway device 108 may be configured to store an aggregate state of one or more asset classes. An asset class may be a type of currency, such as a cryptographic currency or a fiat currency. For instance, in one example, a gateway device 108 may store an aggregate state for a cryptographic currency unique to the blockchain network 106. In another example, the gateway device 108 may store the state for the cryptographic currency as well as an aggregate state for the United States Dollar. The aggregate state stored in the gateway device 108 may be an accounting of the unspent transaction outputs and currency amounts associated therewith for that asset class for each computing device 102 registered therewith.

For instance, the user of the computing device 102 may have a desire to be able to conduct offline blockchain transactions using the computing device 102. The user may, using the computing device 102, register with a gateway device 108a. As part of the registration process, the computing device 102 may transmit (e.g., using any suitable communication network and method, such as an application programming interface, web page, application program, etc.) the public key of the computing device's cryptographic key pair to the gateway device 108a. The gateway device 108a may store the public key as well as an aggregate state of the computing device's blockchain wallet for the asset class(es) of the gateway device 108a therein, also referred to herein as an asset state. In cases where the blockchain wallet has not yet been used for transactions for that asset class, the asset state may be simply that the blockchain wallet has none of that asset available. In cases where the blockchain wallet has an existing transaction history, the gateway device 108a may identify all transactions involving the blockchain wallet in the blockchain, using the public key, to identify the aggregate asset state for the computing device 102, including its unspent transaction outputs and the associated currency amounts.

Once the asset state for the computing device 102 is identified and registered in the gateway device 108a, the gateway device 108a may identify a time-limited credential for the computing device 102. The time-limited credential may be any data value that can be used as a credential by the computing device 102 for proof of its authorization to perform an offline blockchain transaction. The credential may be, for instance, a digital certificate, a digital signature generated by the gateway device 108a, a random or pseudo-random value, or any other suitable value. The credential may be time-limited such that it must be used in an offline blockchain transaction within a predetermined period of time for such a transaction to be valid. In some cases, the period of time may be a limit on the transfer of the time-limited credential to a recipient (e.g., the external device 104) of an offline blockchain transaction. In other cases, the period of time may be a limit on when the recipient connects to its own gateway device 108b for the transaction to be verified and processed successfully. The predetermined period of time may be set by the gateway device 108a, or may be set by the computing device 102, such as in its request for a credential. For example, the user of the computing device 102 may have a preference as to how long they want the credential to last, such as if they know when they will be wanting to perform an offline blockchain transaction.

In cases where the computing device 102 is requesting a new time-limited credential (e.g., if the computing device 102 has previously registered with a gateway device 108), the computing device 102 may be required to perform attestation as part of the request process for the time-limited credential. In such cases, the TEE may generate attestation data, which may include data regarding the application programs stored in and executed by the TEE and data stored therein. For instance, the attestation data may include versioning information for the TEE and its application programs as well as data indicating that the TEE has not been tampered with and is still genuine. The attestation data may be transmitted to the gateway device 108, where the gateway device 108 may be required to successfully validate the attestation data for the TEE before a time-limited credential is generated and transmitted back to the computing device 102. Any suitable methods for attestation of the TEE that will be apparent to persons having skill in the relevant art may be used to ensure that the TEE is genuine and has not been tampered with prior to provisioning of time-limited credentials.

The computing device 102 may receive the time-limited credential and its asset state from the gateway device 108a following registration. The time-limited credential may be stored in the TEE of the computing device 102. The asset state may be stored in the TEE, or may be stored in a separate memory of the computing device 102. When the computing device 102 is to participate in an offline blockchain transaction, the computing device 102 may receive at least a transaction amount for the blockchain transaction. The transaction amount may be received via any suitable method, such as from a transmission from an external device 104, or input via an input device interfaced with the computing device 102, such as from a user typing in a transaction amount using a keyboard of the computing device 102.

Once the transaction amount is received, the computing device 102 may (e.g., via the blockchain wallet application program, a separate application program executed in the TEE, etc.) verify that the blockchain wallet has enough currency to cover the transaction. The verification may include a check with the asset state received from the gateway device 108a for the computing device 102 for the asset being used in the offline blockchain transaction. If the asset state indicates that the computing device 102 does not have enough currency to cover the transaction, the user of the computing device 102 may be informed and the transaction may be prohibited. If there is enough currency to cover the transaction, then the computing device 102 may generate a new blockchain data value for the transaction. The blockchain data value may include the received transaction amount, and enough unspent transaction outputs necessary to cover the transaction amount. In cases where the computing device 102 may be due change, an address may be generated using the computing device's public key to receive excess currency as part of the offline blockchain transaction.

The blockchain data value may also include the time-limited credential, or may be otherwise accompanied by the time-limited credential (e.g., in transmissions by the computing device 102). Once the blockchain data value is generated, the computing device 102 may digitally sign the blockchain data value using the private key stored in the TEE. The signed blockchain data value may then be transmitted to the external device 104. In some embodiments, the blockchain data value may also include a destination address prior to signing for the offline blockchain transaction that corresponds to the blockchain wallet of the external device 104. In such embodiments, the external device 104 may transmit the destination address to the computing device 102, or may transmit the external device's public key to the computing device 102 for use in generating a destination address thereby. In other embodiments, the external device 104 may generate a destination address using its public key after receiving the signed blockchain data value, where the external device 104 may include the destination address when submitting the blockchain transaction for verification once online.

Once the external device 104 has the signed blockchain data value, the external device 104 may transmit the signed blockchain data value to a gateway device 108 (e.g., the same gateway device 108a or another gateway device 108b that is associated with the same asset class) once an active connection is once again available (e.g., the external device 104 is "online"). In some instances where the blockchain data value may include the time-limited credential, the time-limited credential may be removed by the external device 104, but may still transmit the time-limited credential to the gateway device 108 accompanying the blockchain data value (e.g., where the time-limited credential may thereby not be added to the blockchain). In some cases, the external device 104 may not be required to sign the blockchain data value, but may simply forward the blockchain data value as signed by the computing device 102 to the gateway device 108. The gateway device 108b may receive the signed blockchain data value and may verify the blockchain transaction using traditional methods (e.g., verifying unspent transaction outputs, the digital signature using the public key, etc.) and also verify that the time-limited credential was used within the predetermined period of time and by the computing device 102 to which it was provisioned (e.g., by verifying the digital signature using the public key that was provided during registration of the time-limited credential included in the blockchain data value). If the transaction is successfully verified, it may be added to the blockchain using traditional methods and systems. In some cases, the time-limited credential may be removed from the blockchain data value prior to addition to the blockchain, if applicable. Each gateway device 108 may then update the asset state for both the computing device 102 and external device 104. Updating of the asset state may include updating the unspent transaction outputs and associated currency amounts, such as by removing unspent transaction outputs for the computing device's asset state and by adding a new unspent transaction output for the asset state of the external device 104 for the new blockchain transaction.

In some embodiments, once asset states have been updated, gateway devices 108 may transmit notifications to the computing device 102 and external device 104 with their updated asset states. Each device may receive the updated asset state and may update the asset state data stored locally therein. In some instances, computing devices 102 and external devices 104 may update their own asset states when a blockchain transaction is conducted. For example, the computing device 102 may update its asset state once the signed blockchain data value is transmitted to the external device 104 for an offline blockchain transaction, or when an online blockchain transaction is submitted to a node for processing. In some cases, the computing device 102 may update its asset state, but may also receive notifications of updated asset states from gateway devices 108, which may be used for synchronization, such as to ensure that the local asset state is accurate as to the data for the computing device 102 stored in the blockchain. If the computing device 102 wants to proceed with a new offline blockchain transaction, the computing device 102 may request a new time-limited credential from the gateway device 108. In some cases, the original time-limited credential may be suitable for use by the computing device 102 in multiple offline blockchain transactions, as long as the requirements (e.g., time limit) are met by the subsequent offline transaction. In some instances, an updated asset state may be provided to the computing device 102 only when a new time-limited credential is received, or when the computing device 102 requests an updated asset state, such as by going back online with the blockchain network 106.

In some embodiments, the computing device 102 may be configured to perform multiple offline blockchain transactions during a period of being offline with the blockchain network 106. In such embodiments, the computing device 102 may update its asset state once a signed blockchain data value is transmitted to an external device 104 while the computing device 102 is still offline with the blockchain network 106. In these embodiments, the computing device 102 may be configured to perform an additional offline blockchain transaction using the same time-limited credential, or may receive multiple time-limited credentials from a gateway device 108 for use in offline blockchain transactions. In such an instance, time-limited credentials may be single-use and may have a predetermined order for usage, where such an order may be taken into account by the gateway device 108 during processing once signed blockchain data values are received from external devices 104 (e.g., if a secondary time-limited credential is received before any other credential, the gateway device 108 may await processing thereof before receiving a primary time-limited credential, such as due to different timing in external devices 104 going online). In these embodiments, the asset state may be updated by the computing device 102 offline, such as to prevent double spend by the computing device 102. For example, if the computing device 102 uses all unspent transaction outputs for a first offline blockchain transaction, any subsequent offline blockchain transactions would be prohibited until a new asset state is received from the gateway device 108 with no unspent transaction outputs.

In some embodiments, gateway devices 108 may implement asset aggregation functions through the use of smart contracts. For instance, the blockchain may include one or more smart contracts that are configured to perform asset state aggregation when a new transaction is added to the blockchain that includes a blockchain wallet registered with the gateway device 108. In some cases, asset aggregation functions may be implemented through smart contracts via other devices, such as the computing device 102 (e.g., inside a TEE therein). In other embodiments, actions performed by gateway devices 108 may be automated in a similar fashion. In some instances, gateway devices 108 may update asset states each time a new block is added to the blockchain. In other instances, gateway devices 108 may update asset states when a request is received for an updated asset state or for a new time-limited credential. In other instances, gateway devices 108 may update asset states periodically (e.g., daily). In such instances, the period may be based on the time-limit period for the time-limited credential, such that asset states are not updated in gateway devices 108 while a time-limited credential is still usable in an offline transaction.

The methods and systems discussed herein enable a computing device 102 to participate in a blockchain transaction while both sender and recipient are offline from a blockchain network 106. The use of a time-limited credential and aggregated asset states from gateway devices 108 ensures that a computing device 102 can only conduct an offline blockchain transaction when authorized, and prevents the ability for the computing device 102 to double spend due to use of the asset state and requirement of the time-limited credential for any offline transactions. Gateway devices 108 included in the blockchain network 106 can facilitate this functionality through existing blockchain nodes, requiring minimal modification to existing blockchain networks 106, thus resulting in a significant improvement without significant resource expenditure.

Computing Device

Figure 2:
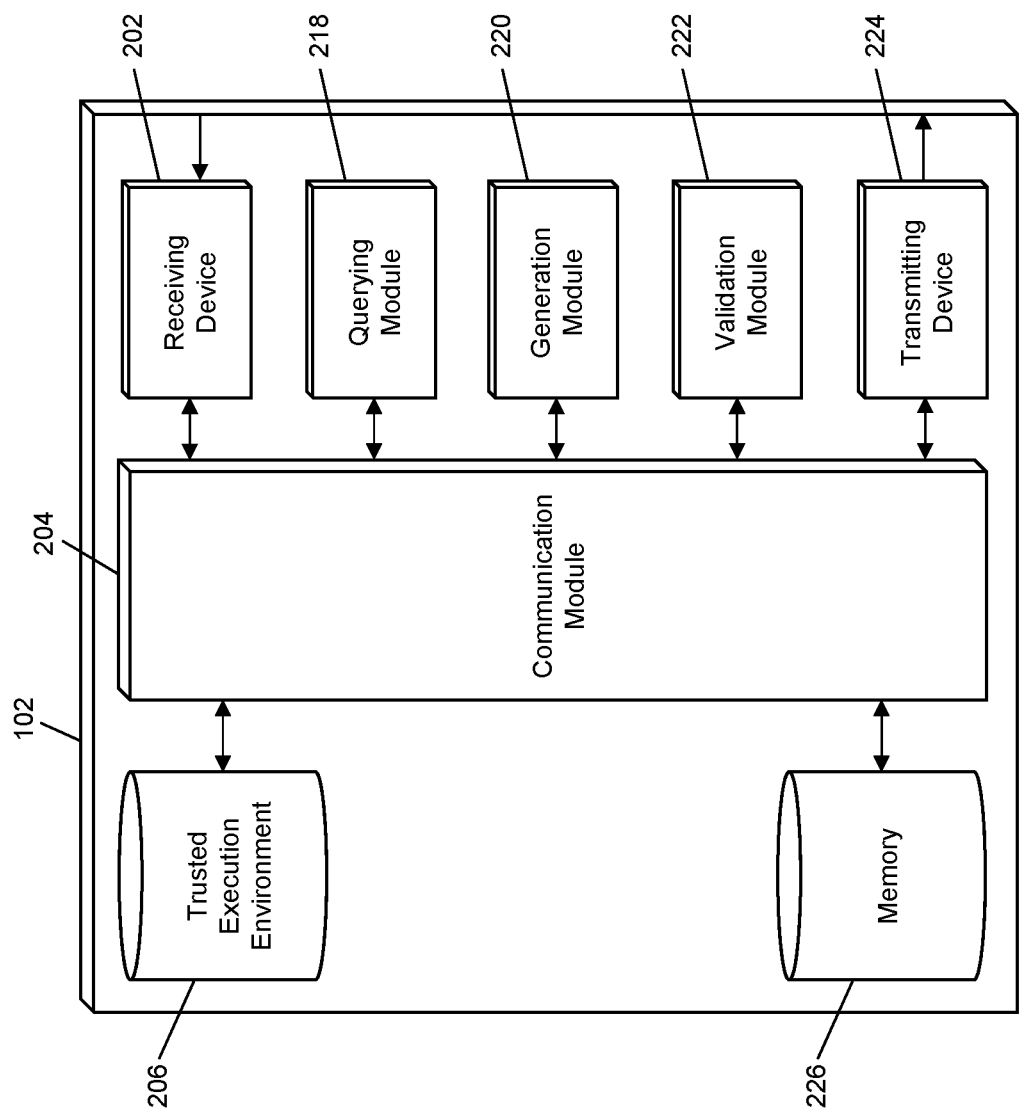
FIG. 2 is a block diagram illustrating the computing device of the system of FIG. 1 for performing offline blockchain transactions through a trusted execution environment in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102 if a trusted execution environment were included therein. In some cases, each gateway device 108 and external device 104 in the blockchain network in the system 100 may be configured similar to the computing device 102 in FIG. 2 or computer system 500 in FIG. 5, such as including the components illustrated therein.

The computing device 102 may include a receiving device 202. The receiving device 202 may be configured to receive data over one or more networks via one or more network protocols. In some instances, the receiving device 202 may be configured to receive data from external devices 104, gateway devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by gateway devices 108 that are superimposed or otherwise encoded with asset state information and time-limited credentials. The receiving device 202 may also be configured to receive data signals electronically transmitted by external devices 104, which are superimposed or otherwise encoded with destination addresses and/or public keys for blockchain wallets used to generate blockchain addresses. In cases where the computing device 102 may be a recipient for an offline blockchain transaction, the receiving device 202 may receive data signals electronically transmitted by external devices 104 that are superimposed or otherwise encoded with signed blockchain data values.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may include a trusted execution environment (TEE) 206. The TEE 206 may be a secure storage area in the computing device 102 that is protected with respect to confidentiality and integrity, and may be isolated from the rest of the components in the computing device 102 such that only application programs stored in the TEE 206 or otherwise approved by the TEE 206 may access data stored therein. The TEE 206 may be such that any attempted tampering of the TEE 206 or access thereto may result in destruction or other inoperability of the TEE 206 to prevent compromise thereof. The TEE 206 may be configured to store at least a private key of a cryptographic key pair that comprises a blockchain wallet of the computing device 102 as well as any time-limited credentials received from gateway devices 108. In some cases, the asset states for the computing device's blockchain wallet may be stored in the TEE 206.

The computing device 102 may include a querying module 218. The querying module 218 may be configured to execute queries on databases to identify information. The querying module 218 may receive one or more data values or query strings, and may execute a query string based thereon on an indicated database, such as the TEE 206 or a memory 226 of the computing device 102 to identify information stored therein. The querying module 218 may then output the identified information to an appropriate engine or module of the computing device 102 as necessary. The querying module 218 may, for example, execute a query on the memory 226 of the computing device 102 to identify the asset state for the computing device's blockchain wallet to determine if an offline blockchain transaction can be conducted, to update the asset state for the computing device 102, etc.

The computing device 102 may also include a generation module 220. The generation module 220 may be configured to generate data for use by the computing device 102 in performing the functions discussed herein. The generation module 220 may receive instructions as input, may generate data based on the instructions, and may output the generated data to one or more modules of the computing device 102. For example, the generation module 220 may be configured to generate new blockchain data values, generate blockchain addresses, generate cryptographic key pairs, generate digital signatures, etc.

The computing device 102 may also include a validation module 222. The validation module 222 may be configured to perform validations and verifications for the computing device 102 as part of the functions discussed herein. The validation module 222 may receive instructions as input, which may include data to be validated and/or data to be used in the validation. The validation module 222 may perform a validation or verification as requested, and may output a result of the validation to another module or engine of the computing device 102. The validation module 222 may, for example, be configured to validate digital signatures, validate asset states, validate time-limited credentials, or perform any other validations for the computing device 102 as discussed herein.

The computing device 102 may also include a transmitting device 224. The transmitting device 224 may be configured to transmit data over one or more networks via one or more network protocols. In some instances, the transmitting device 224 may be configured to transmit data to external devices 104, gateway devices 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to external devices 104 that are superimposed or otherwise encoded with signed blockchain data values. The transmitting device 224 may also be configured to electronically transmit data signals to gateway devices 108 that are superimposed or otherwise encoded with registration data, requests for updates asset states, requests for new time-limited credentials, etc. In cases where the computing device 102 may be a recipient for an offline blockchain transaction, the transmitting device 224 may be configured to electronically transmit data signals to external devices 104 that are superimposed or otherwise encoded with a public key of the computing device's cryptographic key pair and/or a destination address for the offline blockchain transaction. In such embodiments, the transmitting device 224 may also be configured to transmit signed blockchain data values received from the external device 104 to a gateway device 108.

The computing device 102 may also include a memory 226. The memory 226 may be configured to store data for use by the computing device 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, additional blockchain data, credentials for validation, usage rule templates, communication data for gateway devices 108, smart contracts, signature generation and verification algorithms, address generation algorithms, blockchain wallet application program code, asset state data, etc.

Process for Offline Blockchain Transactions

Figure 3:
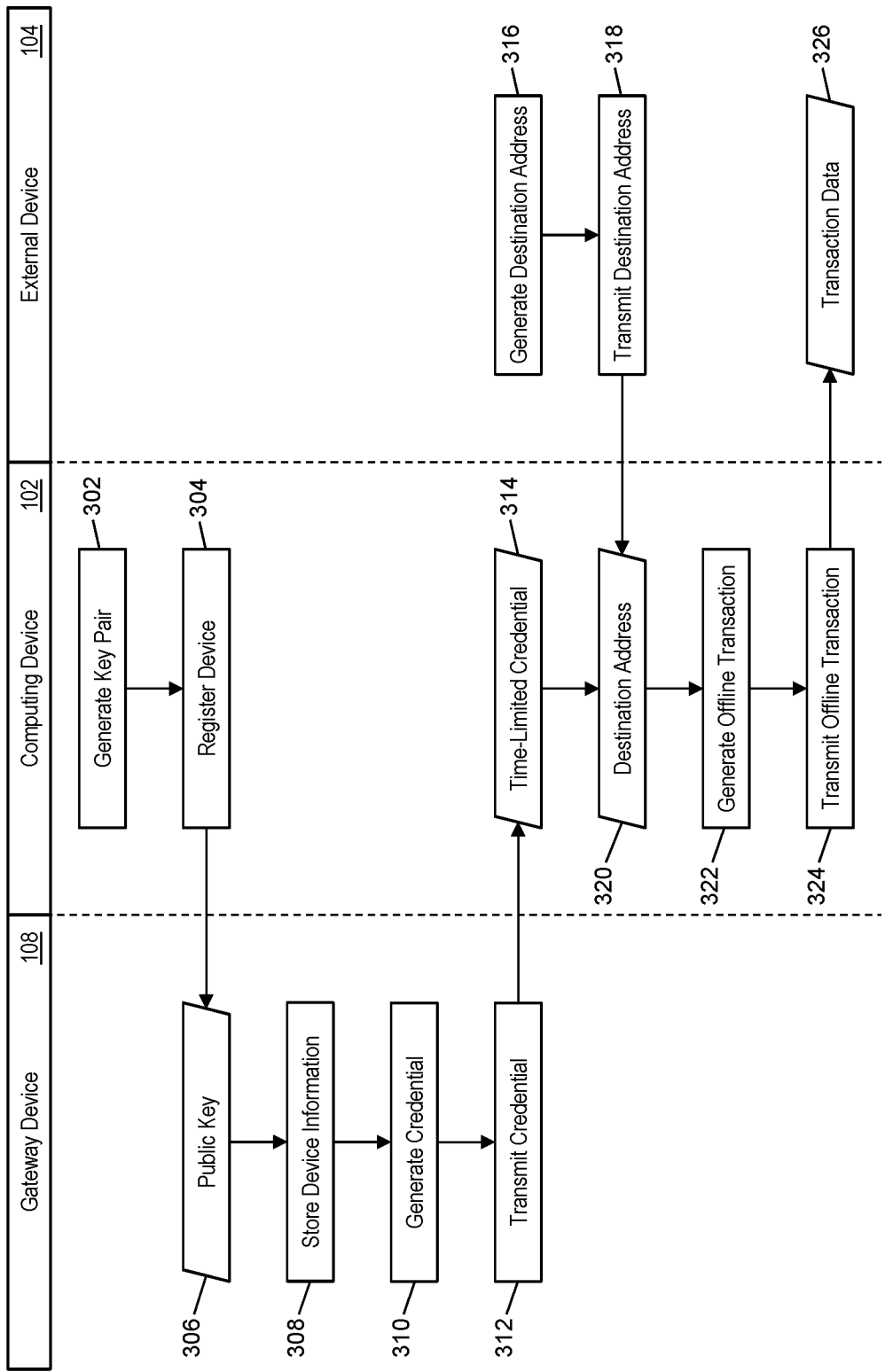
FIG. 3 is a flow diagram illustrating a process for performing offline blockchain transactions in the system of FIG. 1 in accordance with exemplary embodiments.

FIG. 3 illustrates an example process executed in the system 100 of FIG. 1 for processing offline blockchain transactions through use of a trusted execution environment and time-limited credentials.

In step 302, the generation module 220 of the computing device 102 may generate a cryptographic key pair comprised of a private key and a public key, where the private key may be stored in the TEE 206 of the computing device 102. In some instances, the key pair may be generated in the TEE 206 itself, such as by the generation module 220 being included within the TEE 206 or by a separate application program stored in and executed within the TEE 206. In some cases, the public key may also be stored in the TEE 206, or may be stored in a separate memory 226 of the computing device 102. In step 304, the transmitting device 224 of the computing device 102 may electronically transmit a data signal to the gateway device 108 for registration of the computing device's blockchain wallet. The data signal may include at least the public key of the computing device 102, and may also include a specified asset category as well as an attestation from the TEE 206 that it is genuine and has not been tampered with.

In step 306, the gateway device 108 may receive the public key (e.g., and attestation, as applicable) from the computing device 102. In step 308, the gateway device 108 may store the public key for the computing device's blockchain wallet as well as an aggregated asset state of the computing device 102 that includes any unspent transaction outputs associated therewith and the currency amounts available for the outputs of the asset category. In step 310, the gateway device 108 may generate a time-limited credential for the computing device 102. In cases where attestation is included, the gateway device 108 may only generate the time-limited credential if the attestation is successfully validated. In some embodiments, the time-limited credential may be a digital certificate that is unique to the computing device 102, and may be limited for usage during a predetermined period of time. In step 312, the gateway device 108 may electronically transmit the time-limited credential to the computing device 102. In some cases, the transmission may also include the asset state of the computing device's blockchain wallet for the asset category as determined by the gateway device 108.

In step 314, the receiving device 202 of the computing device 102 may receive the time-limited credential and asset state. The time-limited credential may be stored in the TEE 206 of the computing device 102. In some cases, the asset state may also be stored in the TEE 206 or may be stored in the separate memory 226. When it is time for an offline blockchain transaction, then, in step 316, the external device 104 that will be the recipient of the offline blockchain transaction may generate a destination blockchain address using its own public key. In step 318, the external device 104 may transmit its destination address to the computing device 102 using a suitable communication network and method. In step 320, the receiving device 202 of the computing device 102 may receive the destination address from the external device 104.

In step 322, the generation module 220 of the computing device 102 may generate a blockchain data value for the offline blockchain transaction. The blockchain data value may include a transaction amount for the offline transaction, the destination address received from the external device 104, and the time-limited credential received from the gateway device 108 (e.g., as part of the blockchain data value or separate therefrom, as discussed above). The generation module 220 of the computing device 102 may also generate (e.g., inside of the TEE 206) a digital signature for the blockchain data value using the private key of the computing device 102. In step 324, the transmitting device 224 of the computing device 102 may electronically transmit the signed blockchain data value to the external device 104 using a suitable communication network and method. In step 326, the external device 104 may receive the signed blockchain data value. The external device 104 may then store the signed blockchain data value until a connection is available with a gateway device 108, at which time the blockchain data value may be submitted for verification and updating of the blockchain. In some embodiments, the external device 104 may be configured to immediately validate the time-limited credential for updating of its own asset state.

Exemplary Method for Performing Offline Blockchain Transactions

Figure 4:
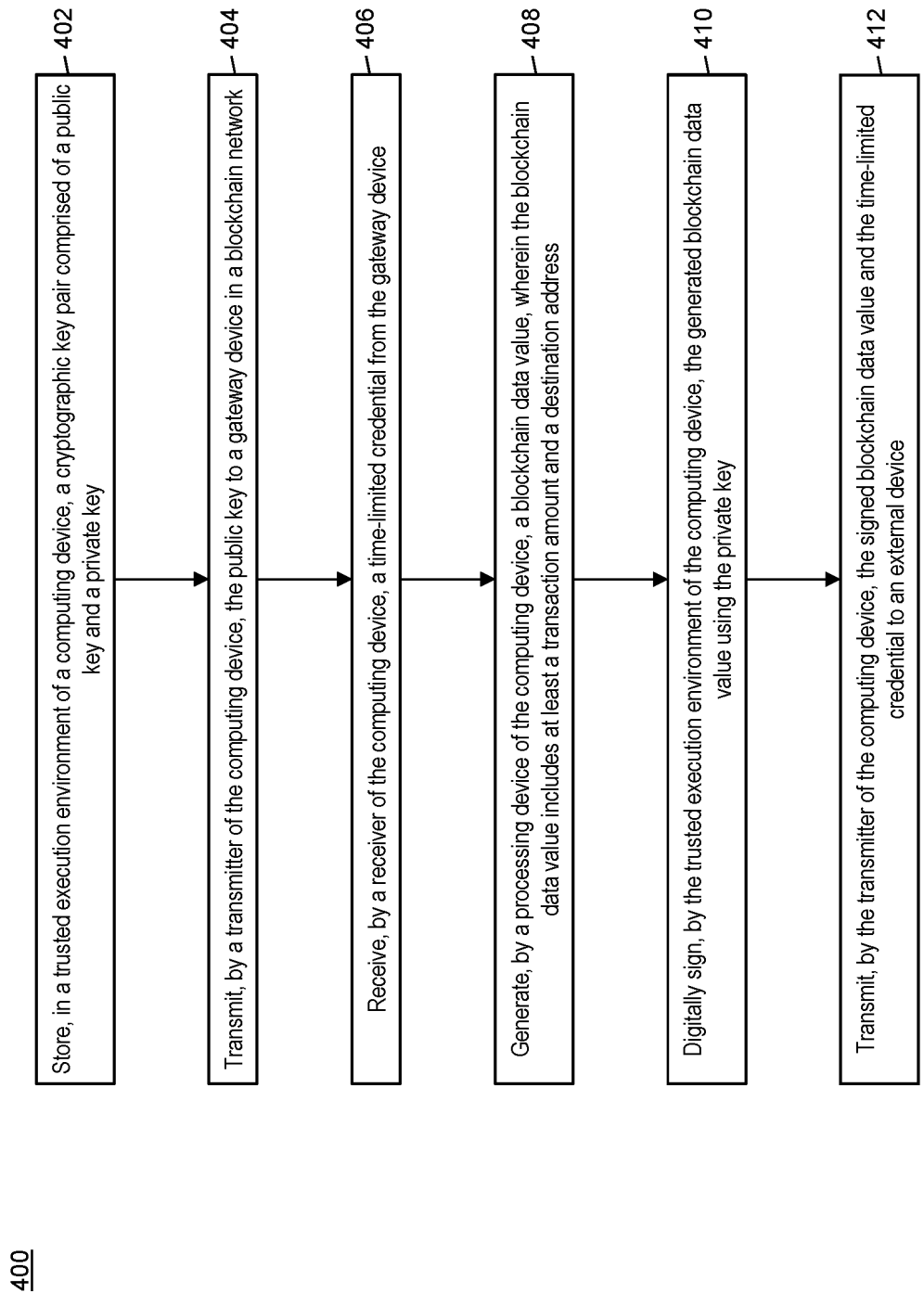
FIG. 4 is a flow chart illustrating an exemplary method for performing secure, verifiable, offline blockchain transactions through a trusted execution environment and time-limited credentials in accordance with exemplary embodiments.

FIG. 4 illustrates a method 400 for performing secure, verifiable, and offline blockchain transactions through a trusted execution environment and time-limited credentials.

In step 402, a cryptographic key pair may be stored in a trusted execution environment (e.g., the trusted execution environment 206) of a computing device (e.g., the computing device 102), the cryptographic key pair comprised of a public key and a private key. In step 404, the public key may be transmitted by a transmitter (e.g., the transmitting device 224) of the computing device to a gateway device (e.g., the gateway device 108) in a blockchain network (e.g., the blockchain network 106). In step 406, a time-limited credential may be received by a receiver (e.g., the receiving device 202) from the gateway device.

In step 408, a blockchain data value may be generated by a processing device (e.g., the generation module 220) of the computing device, wherein the blockchain data value includes at least a transaction amount and a destination address. In step 410, the generated blockchain data value may be digitally signed by the trusted execution environment of the computing device using the private key. In step 412, the signed blockchain data value and the time-limited credential may be transmitted by the transmitter of the computing device to an external device (e.g., the external device 104).

In one embodiment, the private key may be inaccessible by any component in the computing device except the trusted execution environment. In some embodiments, the method 400 may further include receiving, by the receiver of the computing device, the destination address from the external device prior to generating the blockchain data value.

In one embodiment, the method 400 may also include storing, in a memory (e.g., the memory 226) of the computing device, an asset state for the computing device, where the asset state includes at least one or more unspent transaction outputs and associated currency amounts. In a further embodiment, the method 400 may even further include updating, by the processing device of the computing device, the stored asset state based on the generated blockchain data value. In another further embodiment, the memory may be separate from the trusted execution environment. In yet another further embodiment, the method 400 may also include: receiving, by the receiver of the computing device, a notification message from the gateway device; and updating, by the processing device of the computing device, the stored asset state based on the notification message. In an even further embodiment, the notification message may include modified unspent transaction outputs and associated currency amounts.

Computer System Architecture

FIG. 5 illustrates a computer system 500 in which embodiments of the present disclosure, or portions thereof, may be implemented as computer-readable code. For example, the computing device 102, external device 104, and gateway devices 108 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for performing secure, verifiable, offline blockchain transactions through a trusted execution environment and time-limited credentials. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for performing secure, verifiable, offline blockchain transactions through a trusted execution environment and time-limited credentials, comprising:

storing, in a trusted execution environment of a computing device, a cryptographic key pair comprised of a public key and a private key;

transmitting, by a transmitter of the computing device, the public key to a gateway device in a blockchain network;

receiving, by a receiver of the computing device, a time-limited credential from the gateway device, the time-limited credential authorizing an offline blockchain transaction;

generating, by a processing device of the computing device, a blockchain data value for the offline blockchain transaction, wherein the blockchain data value includes at least a transaction amount and a destination address;

digitally signing, by the trusted execution environment of the computing device, the generated blockchain data value using the private key; and transmitting, by the transmitter of the computing device, the signed blockchain data value and the time-limited credential to an external device, wherein the computing device and the external device are offline from the blockchain network.

2. The method of claim 1, wherein the private key is inaccessible by any component in the computing device except the trusted execution environment.

3. The method of claim 1, further comprising:

storing, in a memory of the computing device, an asset state for the computing device, where the asset state includes at least one or more unspent transaction outputs and associated currency amounts.

4. The method of claim 3, further comprising:

updating, by the processing device of the computing device, the stored asset state based on the generated blockchain data value.

5. The method of claim 3, further comprising:

receiving, by the receiver of the computing device, a notification message from the gateway device; and updating, by the processing device of the computing device, the stored asset state based on the notification message.

6. The method of claim 5, wherein the notification message includes the updated stored asset state, the updated stored asset state including updated unspent transaction outputs and associated currency amounts.

7. The method of claim 3, wherein the memory is separate from the trusted execution environment.

8. The method of claim 1, further comprising:

receiving, by the receiver of the computing device, the destination address from the external device prior to generating the blockchain data value.

9. The method of claim 1, comprising:

transmitting, by the transmitter of the computing device, to the gateway device an attestation of data stored in the trusted execution environment of the computing device; and wherein the time-limited credential is received after validation of the attestation by the gateway device.

10. The method of claim 1, wherein the gateway device stores a record of the amount of currency and unspent transaction outputs associated with each node in the blockchain network including the computing device.

11. A system for performing secure, verifiable, offline blockchain transactions through a trusted execution environment and time-limited credentials, comprising:

a gateway device of a blockchain network;

a computing device including a trusted execution environment storing a cryptographic key pair comprised of a public key and a private key, a transmitter transmitting the public key to the gateway device, a receiver receiving a time-limited credential from the gateway device, the time-limited credential authorizing an offline blockchain transaction, and a processing device generating a blockchain data value for the offline blockchain transaction, wherein the blockchain data value includes at least a transaction amount and a destination address, wherein the trusted execution environment digitally signs the generated blockchain data value using the private key, and the transmitter transmits the signed blockchain data value and the time-limited credential to an external device, wherein the computing device and the external device are offline from the blockchain network; and an external device receiving the signed blockchain data value.

12. The system of claim 11, wherein the private key is inaccessible by any component in the computing device except the trusted execution environment.

13. The system of claim 11, further comprising:

a memory of the computing device storing an asset state for the computing device, where the asset state includes at least one or more unspent transaction outputs and associated currency amounts.

14. The system of claim 13, wherein the processing device of the computing device updates the stored asset state based on the generated blockchain data value.

15. The system of claim 13, wherein the receiver of the computing device receives a notification message from the gateway device, and the processing device of the computing device updates the stored asset state based on the notification message.

16. The system of claim 15, wherein the notification message includes the updated stored asset state, the updated stored asset state including updated unspent transaction outputs and associated currency amounts.

17. The system of claim 13, wherein the memory is separate from the trusted execution environment.

18. The system of claim 11, wherein the receiver of the computing device receives the destination address from the external device prior to generating the blockchain data value.

19. The system of claim 11, comprising:

the transmitter of the computing device transmitting to the gateway device an attestation of data stored in the trusted execution environment of the computing device; and wherein the time-limited credential is received after validation of the attestation by the gateway device.

20. The system of claim 11, wherein the gateway device stores a record of the amount of currency and unspent transaction outputs associated with each node in the blockchain network including the computing device.

* * * * *